United States Patent [19]

Vea

[11] Patent Number: 4,854,546

[45] Date of Patent: Aug. 8, 1989

[54] CABLE INSTALLATION AND PLACEMENT IMPLEMENT

[75] Inventor: Cary A. C. Vea, Santa Martin, Calif.

[73] Assignee: Polytron Corporation, San Martin, Calif.

[21] Appl. No.: 209,222

[22] Filed: Jun. 20, 1988

[51] Int. Cl.$^4$ .......................................... B65H 59/00
[52] U.S. Cl. ............................................. 254/134.3 R
[58] Field of Search ............... 254/134.3 R, 134.3 FT, 254/134.3 SC, 134.4, 134.7; 15/104.32, 104.33; 294/1.1, 66.1, 82.1, 82.32, 86.1, 86.24, 86.25, 86.4, 90, 95, 97

[56] References Cited

U.S. PATENT DOCUMENTS

| | | | |
|---|---|---|---|
| 1,035,994 | 8/1912 | Mueller | 254/134.4 |
| 3,028,146 | 4/1962 | Sparks | 254/134.3 FT |
| 3,035,817 | 5/1962 | Wilson | 254/134.3 FT |
| 3,182,960 | 5/1965 | French | 254/134.7 |
| 3,330,533 | 7/1967 | Blume | 15/104.32 |
| 4,736,978 | 4/1988 | Cielker | 254/134.7 |

Primary Examiner—Robert C. Watson
Attorney, Agent, or Firm—Michael J. Hughes

[57] ABSTRACT

The present invention is a cable installation and placement implement (10) adapted for use by installers in placing elongated cables in restricted volumes such as ceiling spaces in office buildings. The implement (10) is of modular construction and is formed using a basket segment (12), one or more extendor segments (14) to accomplish the desired longitudinal length, and a grasping segment (16) for attaching the cable (18). Each of the segments (11) is adapted to releasably mate at a junction (28) with another of the segments (11) via a coupling between a female portion (30) on one end of a tubular intermediate portion (34) and a male portion (32) on the opposite end. The basket segment (12) is provided with basket straps (44) to create an expanded diameter section for support and to facilitate rolling. The implement (10) is intended for use primarily by commercial cable installers, especially those working in limited access volumes having obstacles arrayed therein.

18 Claims, 1 Drawing Sheet

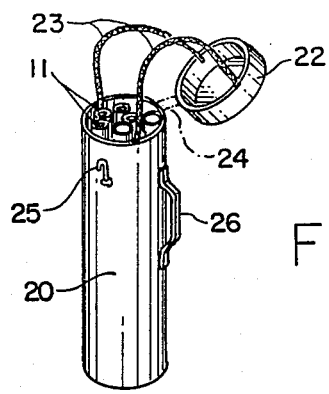
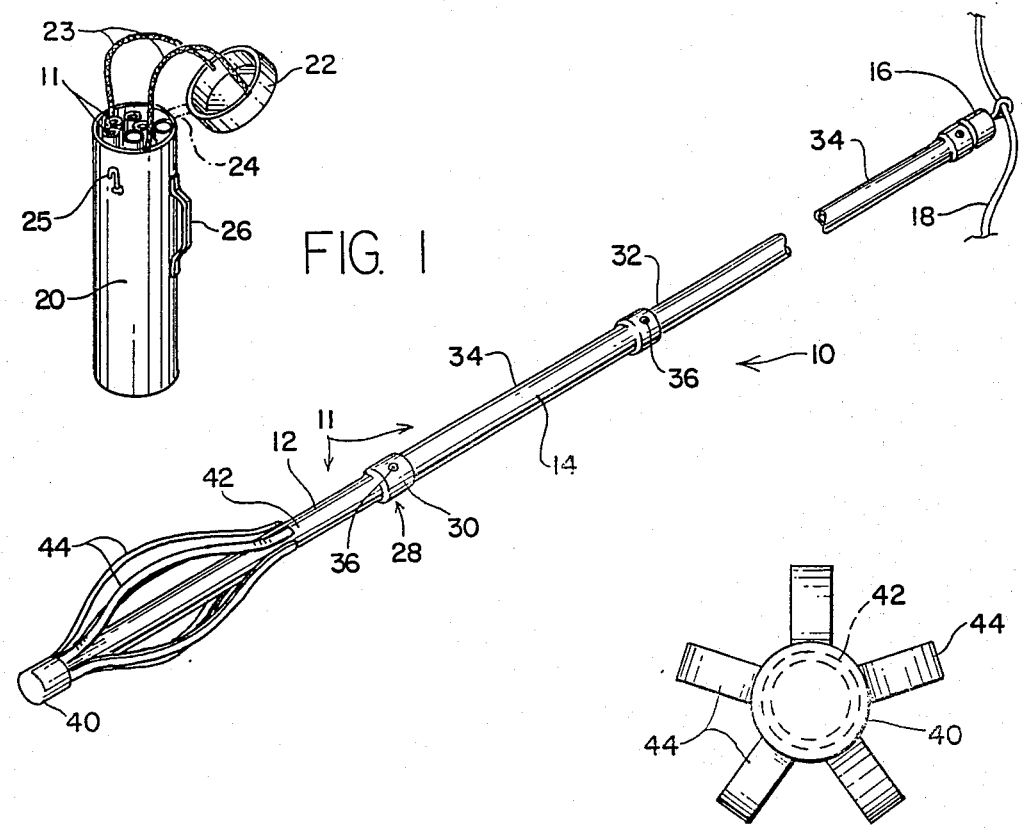
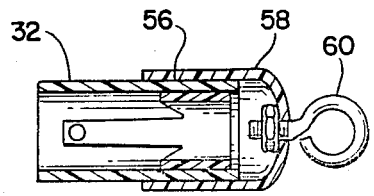
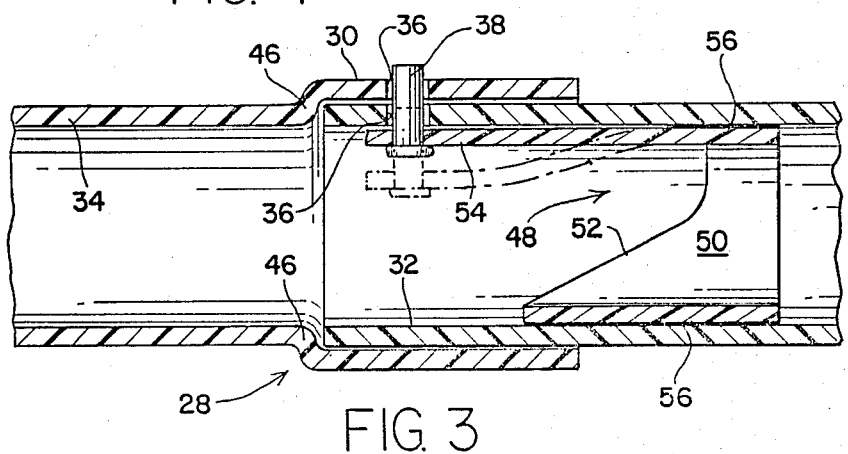
FIG. 1
FIG. 2
FIG. 4
FIG. 3

CABLE INSTALLATION AND PLACEMENT IMPLEMENT

TECHNICAL FIELD

The present invention relates generally to tools and more specifically to tools and implements utilized to position cables in difficult to access positions.

BACKGROUND ART

A problem which is inherent in construction of modern buildings is the placement of communications and electrical cables within the walls, sub-floors and ceilings. Modern office buildings, in particular, tend to be constructed in a "drop-ceiling" style for fire prevention reasons. This results in a space being created between the apparent ceiling of a room and the floor of the next story. It is within this space that cabling is usually arrayed.

Persons involved in installing cables on behalf of telephone operations, computer networking personnel and other cable related applications encounter substantial difficulty in installing the cables within the ceiling space. Typically the ceiling space is cluttered in that the apparent ceiling is hung from the girders on wires, thus creating substantial barriers to placement of the cables. Furthermore, air conditioning ducts, lighting fixtures and other elements are present in the ceiling space to interfere with an orderly arrangement of cables. Additionally, since the ceiling space is not designed to support substantial weight it is typically not feasible for an installer to physically enter the space and to crawl around to position the cable as would be the situation in an attic or housing foundation.

Therefore, installers have had to come up with other methods of successfully placing the cable over a substantial distance within the ceiling space. One technique commonly used is to simply continue moving the installer's ladder from ceiling tile to ceiling tile while pushing the cabling ahead a short distance at a time. Unfortunately, since typical ceiling tiles are somewhat fragile and have a tendency to shed, an increase in the number of tiles removed in an installation operation leads to a corresponding increase in breakage of tiles and in dust and debris clean-up activity. Another common method is to attempt to utilize the cable as a lasso by throwing a coil ahead of the installer in an attempt to cover the space between multiple ceiling tiles in a single toss. The inventor has even observed installers utilizing a slingshot and spinning reel technique. Unwound coat hangers and similar hooked elements have also been utilized in an attempt to grab the cable from a forward position and to pull it into position.

In addition to inherent inelegance, the prior art methods all suffer various disadvantages in installing cabling in a cluttered ceiling space. Therefore, substantial room for improvement exists in this field.

SUMMARY OF THE INVENTION

Accordingly, it is an object of the present invention to provide an implement which substantially eases the task of installing cabling within a cluttered ceiling space.

It is another object of the present invention to allow cable installation in a ceiling space with a minimum requirement of moving the installer's ladder from one tile opening to another.

It is a further object of the present invention to provide a modular element which may be adjusted for cable translation operations of different lengths.

It is yet another object of the present invention to minimize ceiling tile breakage and clean-up activity associated with an installation operation.

It is still another object of the invention to minimize the risks of electrical shock to installation personnel.

It is a still further object of the present invention to provide an implement which may be utilized to "crawl" over and around obstacles and to steer or guide the cable to a target opening within the ceiling space.

Briefly, the preferred embodiment of the present invention is a cable installation and placement implement specifically adapted for use in installing communications and electrical cables in the ceiling spaces or subflooring spaces of buildings. The implement is particularly well adapted for utilization in buildings having hanging suspended ceilings with substantial clutter or impediments within the ceiling space.

The preferred embodiment is a modular implement including a basket segment and a gripping segment with a variable number of intermediate extendor segments placed between the other types. The basket segment has a blunt nose and a basket portion which is adapted to be pushed and rolled around and over impediments with minimal snagging. The grasping segment is adapted to be installed last and to actually capture the cable and attach the cable to the overall implement. The extendor segments are serially installed end to end in the implement to extend its length to whatever total length is desired by the user prior to the completion of the implement by installing the grasping segment. All of the segments are adapted to be readily attachable and detachable from each other in an interlocking manner. A snap fit component which is easily disengaged with one hand is provided to hold the interlocking segments together during usage.

An advantage of the present invention is that its modular construction permits the user to select the length of lateral translation [typically effective up to about 30 m (100') with light cable] desired prior to moving the ladder to a new location.

Another advantage of the present invention is that the basket segment is adapted to be manipulated from a distance by the user so as to avoid obstacles which may otherwise snag the cable.

Still another advantage of the present invention is that it allows installers to work during business hours when the spaces beneath the ceiling are occupied without disturbing persons or equipment situated intermediate the access points.

A further advantage of the present invention is that the resulting cable installation utilizes straight segments to achieve a straight-line installation and thus minimizes excess cable.

Yet another advantage of the invention is that it can be used to simultaneously install a variety of disparate cables.

A still further advantage of the present invention is that the cable itself is not introduced into the ceiling space until the completed pathway for its positioning has been established.

Still another advantage of the present invention is that the easy disassembly of the modular implement at the receiving end permits the installer to work in relatively close quarters while still utilizing an elongated shaft for positioning.

A still further advantage of the present invention is that it facilitates installing additional cables when previously installed cables are already in place.

These and other objects and advantages of the present invention will become clear to those skilled in the art upon review of the following specification, the accompanying drawings, and the appended claims.

BRIEF DESCRIPTION OF THE DRAWINGS

FIG. 1 is a partially broken perspective view of a cable placement and installation implement according to the preferred embodiment of the present invention, including the carrying quiver;

FIG. 2 is an end view of a basket segment of the preferred embodiment;

FIG. 3 is a cross-sectional view, taken along line 3—3 of FIG. 1, showing the interlocking mechanism of the segments; and FIG. 4 is an axial cross-sectional view of the grasping segment of the inventive implement.

BEST MODE OF CARRYING OUT THE INVENTION

The present invention is a cable installation and placement implement which is particularly well adapted for utilization in the ceiling spaces in drop ceiling or raised floor type of building constructions. The preferred embodiment of the invention is particularly well adapted to allow a cable installer to quickly conveniently and efficiently install cable between access points within the space. The implement is adapted to be utilized in cluttered or impeded spaces and to allow a single installer, working alone, to effectively deliver cable elements through the space.

The preferred embodiment of the cable installation and placement implement of the present invention is illustrated in a partially broken perspective view in FIG. 1 and is referred to by the general reference character 10. It may be seen from the illustration of FIG. 1 that the implement 10 is comprised of a plurality of discrete segments 11 snapped together to form a unitary elongated device. Three distinct types of segments 11 are utilized in the preferred embodiment of the implement 10. These types of segments 11 include a terminal basket segment 12, one or more intermediate extendor segments 14 and a terminal grasping, segment 16. The basket segment 12 is adapted to be the leading portion of the implement 10 as it is pushed or otherwise moved through the ceiling space, the extendor segments 14 are utilized to extend the total length of the implement 10 to the dimensions desired and the terminal grasping segment 16 is utilized to actually grasp a portion of cable 18 of the type desired to be installed.

The various segments 11 which make up the implement 10 are adapted to be contained within a quiver 20. The quiver 20 is a cylindrical tube closed at one end and open at the other. The open end is provided with a quiver cap 22 to enclose the segments 11. The quiver cap 22 may be attached to the quiver 20 either by a pair of elongated elastic straps 23 (bungi cords) or by an optional cap strap 24 (shown in phantom in FIG. 1) so that the quiver cap 22 does not become lost. The interior of the quiver 20 is adapted to receive an operant set of the segments 11 such that an installer will have readily at hand enough of the segments 11 to complete an installation of the cable 18 from one typical access point to the next. The quiver 20 is also provided with a hanging hook 25 and a carrying handle 26.

The various segments 11 are constructed so as to interlock with one another to provide the elongated semirigid implement 10. The interlocking is achieved at a series of junctions 28 between adjacent segments 11. Each junction 28, the detail of which is shown in detail in FIG. 3 and discussed more particularly in relation thereto, is the intersection between a receiving or female portion 30 of one segment 11 and an insertion or male portion 32 of the adjoining segment 11. Tubular intermediate portions 34 constitute the remainder of each segment 11.

As is visible in FIG. 1, each of the junctions 28, at the female portion 30, includes a pin aperture 36 for receiving and holding a snap pin 38. The insertion of the snap pin 38 into the pin aperture 36 locks adjacent segments together such that accidental disassembly does not occur during use.

The construction of the basket segment 12 is understood both from the illustration of FIG. 1 and of the end view of FIG. 2. From these illustrations it may be seen that the basket segment 12 includes an end cap 40 which fits over the end of a tubular portion 42 so as to form a blunt, closed terminus to the basket portion 12 which is resistant to snagging. A plurality, in the preferred embodiment five (although four has also been shown to be effective), of basket straps 44 are radially spaced about the tubular portion 42 to provide a basket shape. The basket straps 44 are slightly flexible so that they may give under certain conditions to allow the basket portion 12 to be pushed through narrow openings such as fire wall entries, but are strong enough so that they provide support to the implement 10 so that the tubular portion 42 is held off the surface. The shape of the basket is such that it allows the installer to maneuver the implement 10 by twisting the extendor segment 14 which is in the installer's hand so that the basket segment 12 will roll on the basket straps 44 and thus be easily translated to a new position. This greatly facilitates the usage in certain cluttered areas. The shape of the basket portion 12 also facilitates climbing over obstacles in order to best go from one terminus point to another.

The construction and operation of the junction areas 18 which exist at the interface between any two of the segments 11 is best illustrated in the cross-sectional view of FIG. 3. This view illustrates the manner in which the intermediate tube portions 34 of the segments 11 terminate at one end in the female portion 30 and at the other end in the male portion 32. It may be seen in this illustration that the female portion 30 is simply a tubular portion similar to that of the intermediate portion 34 except that it has a slightly greater diameter. The location at which the diameter increases provides a detent 46 which acts as a stop against which the end of the male portion 32 abuts.

The inner diameter of the female portion 30 is selected to be slightly larger than the outer diameter of the male portion 32, which is equivalent to that of the tubular intermediate portion 34. This permits the male portion 32 to slide into the female portion 30 until the end of the male portion 32 abuts against the detent 46 which, if the male portion 32 and the female portion 30 are appropriate radially aligned, permits the snap pin 38 to fit within the pin aperture 36. This fit secures the two segments 11 together so that they do not accidentally become detached during operation.

The snap pin 38 is attached to a spring assembly 48 which urges the snap pin 38 radially outward through a pin aperture 36 in the male portion 32 such that it will engage the pin aperture 36 in the female portion 30. The spring assembly 48 is constructed of a semi-rigid plastic such as polyethylene so that it is generally rigid but that it has flexibility to allow the snap pin 38 to be pushed inward such that it no longer engages the pin aperture 36 of the female portion 30. The spring assembly 48 includes a barrel portion 50 which is adapted to snugly fit within the interior of the male portion 32. The barrel portion 50 is complete and rigid at the position where it is farthest removed from the pin aperture 36 and extends outward to form a tapered portion 52 on the opposite wall from the pin aperture 36. Aligned with the pin aperture 36 is a tongue portion 54 in the form of an elongated strip to which the snap pin 38 is attached. The tapered portion 52 extends outward from the barrel portion 50 a substantial fraction of the length of the tongue portion 54. This anchors and balances the spring assembly 48 so that a balanced resilience is provided to the tongue portion 54. The construction of the spring assembly 48 is unitary except for the optional version in which the snap pin 38 is attached to the tongue 54. This permits construction either by carving the spring assembly 48 from a single piece of polyethylene tubing or by molding as a single element if such is desired. The spring assembly 48 may either be held in position within the male portion 32 by frictional force and the interaction of the snap pin 38 with the pin aperture 36 or it may be held in position by use of an adhesive 56. The adhesive 56 is applied only about the barrel portion 50 and the tapered portion 52 so that the tongue portion 54 may bend freely.

As shown in phantom in FIG. 3, the tongue portion 54 is flexible such that it may bend downward upon a radially inward force placed upon the snap pin 38. When the snap pin 38 is forced inward the tongue bends sufficiently that the snap pin does not extend above the surface of the male portion 32. This permits the male portion 32 to slide into the female portion 30 or out of the female portion 30 as desired. The tongue 54 is resilient such that the snap pin 38 will then be urged radially outward when the force is released such that it either engages the pin aperture 36 of the female portion 30 when it is so aligned or so that it will extend beyond the surface of the male portion 32 when in storage or non-use.

The illustration of FIG. 4 is a cross-sectional view of the grasping segment 16. It may be seen from this illustration that the grasping segment 16 is essentially a truncated segment 11 consisting only of a male portion 32 and a grasping cap 58. The grasping cap 58 is attached to the male portion 32 with a quantity of the adhesive 56. The grasping cap 58 includes a cable attachment element 60 by which the cable 18 ( or a plurality of cables) may be secured to the end of the implement 10. In the preferred embodiment 10 the cable attachment element 60 is in the form of a ring. However, a hook, a "Kellems Grip", a snaplink, a screw link, a clip or any of several other similar sort of mechanism which can cause firm grasping of the cable 18 may be substituted at the user's discretion. It is envisioned that alternate grasping segments 16 will be provided.

In the preferred embodiment, the elements of the segments 11 are constructed of conventional PVC (poly vinyl chloride) piping materials. In one preferred embodiment the extendor segments 14 have a length of 120 cm. (48 inch) (a reference length selected as this in the usual length of a ceiling tile), an outside diameter of 2.1 cm. (0.8 inch) at the male portion and an outside diameter of 2.5 cm. (1.0 inch) at the female portion and a wall thickness of 0.25 cm. 0.1 inch). The basket straps extend for a length of approximately 29.5 cm. (11.5 inch) and have a maximum diameter at the basket portion of approximately 9 cm. (3.6 inch). The quiver 20 is long enough to enclose the segments 11 and in one embodiment is a interior diameter of 10.6 cm. 3.1 inch). Other embodiments include a quiver 20 having a 15 cm (6 in) diameter to hold about enough segments 11 to total about 50 feet in length and a version having a 20 cm (8 in) diameter to encompass twice as many segments. This provides sufficient storage for a usable aggregate length of segments 11 to create a cable installation and placement implement 10 sufficient for most building purposes.

The quiver 20 is adapted to be supported within easy reach of the installer during usage. This may be accomplished either by draping the elastic straps 23 and the attached cap 22 over a ladder cross member or any other available support on by hanging the quiver 20 on the ladder or other available support by using the hanging hook 25 (usually pivotably attached to the quiver 20). This facility greatly eases the installer's fetching and replacement activities.

Of course, other materials such as other varieties of plastics or even metal may be used for the segments. Furthermore, the diameter and length are very much at the discretion of the manufacturer for the particular purposes involved. However, the above materials and dimensions have been found to create an adequate implement.

Various other modifications and alterations of the present invention may be made without departing from the invention. Those skilled in the art will readily recognize additional alternative embodiments and uses. Accordingly, the above disclosure is not to be considered as limiting and the appended claims are to be interpreted as encompassing the entire spirit and scope of the invention.

INDUSTRIAL APPLICABILITY

The cable installation and placement implement 10 of the present invention is particularly adapted for use by personnel involved in installing communications and computer cable, as well as many other types of elongated items, in the dropped ceilings or other ceiling spaces of buildings. It is also adapted for use in any other space in which access is limited and it is necessary to install an elongated cable with the space. The invention is adapted to be used in a wide variety of applications and situations.

The manner in which the cable installation and placement implement 10 of the preferred embodiment is utilized by a typical installer is described as follows.

Typically a cable installer will climb a ladder, lift a ceiling tile and obtain limited visual access to the ceiling space by climbing to the top of the ladder and placing the installer's head within the ceiling space. The installer is then able to visualize a potential path from the present position to the desired terminal position or next access point. Usually, the installer will also have removed a tile at the desired access point to aid this visualization. At this stage the installer will introduce the basket segment 12 into the ceiling space and reach into the quiver 20 for an extendor segment 14. The installer will then attach an extendor segment 14 to the basket segment 12. The extendor segment 14 snap fits into the basket segment 12 to form a unitary semirigid element which may then be manipulated from the remote end of the extendor segment 14 such that the basket segment 12 may be pushed, rolled and lifted along the desired pathway toward the next access point or termination location within the ceiling space. The installer will then, one by one, add additional extendor segments 14 to the end until the basket segment 12 is physically accessible from the next access point. Sometimes it is valuable to use a count of the extendor segments 14 (equal to ceiling tiles on a longitudinal path) to estimate the location of the basket segment 12 at intermediate positions. The installer will then attach the cable 18 (or group of cables) to the cable attachment element 60 of the grasping segment 16 and attach the grasping segment 16 to the end of the terminal extendor segment 14. At this stage, if the installer is working alone, he or she will move to the next access point and again partially enter the ceiling space. The installer will then be able to grasp the basket segment 12 and pull it toward him or her. The basket segment 12 is then detached from the first extendor segment 14 by depressing the snap pin 38 and releasing it from the pin aperture 36. The detached basket segment 12 is then returned to the quiver 20. The extendor segments 14 are then removed one by one and the installer pulls them towards the access point until finally the grasping segment 16 with the attached cable 18 is accessed. At this point the cable 18 will have been installed between the initial access point and the second access point. The installer may then repeat the process to deliver the cable 18 to a new access point or terminate the installation, if such is the case.

This use of the cable installation and placement implement 10 provides for rapid and efficient installation of cables in spaces with otherwise provided great difficulties. The installer is able to operate with a lesser number of access points and is able to achieve straighter sections of cable, thus minimizing the amount of cable necessary. This is desirable both from a cost standpoint and from the standpoint of minimizing possible interference. Since the segments 11 are constructed of non-electrical-conducting plastic materials the implement 10 can be safely used around potential sources of electrical shock. The modular construction of the implement 10 allows the installer to effectively work on a ladder and in restricted spaces since each of the segments is of a manageable length. The snap fit achieved between adjacent segments is designed such that it may be accomplished with one hand whether assembly or disassembly is occurring. This allows the installer to maintain balance with the other hand if necessary. All of the above provide significant advantages over the prior art.

For all of the above and may other non-recited reasons it is expected that the cable installation and placement implement 10 of the present invention will enjoy widespread commercial utility and industrial applicability.

I claim:

1. A cable installation and placement implement comprising:
   a basket segment including a central shaft portion having first connecting means situated at least one end thereof and further having radially flexible basket means formed around said central shaft portion so as to support said central shaft portion a distance from adjacent surfaces and to facilitate movement and placement of the basket segment by permitting the basket segment to be rolled upon said basket means;
   one or more extendor segments, each extendor portion including an elongated shaft portion similar to said central shaft portion of the basket segment, said elongated shaft portion being provided with a second connecting means, adapted to detachably mate with said first connecting means in a colinear manner, situated at one end thereof, and one of said first connecting means situated on the opposing end thereof; and
   a terminal grasping segment including one of said second connecting means and cable attachment means for attaching items to the implement.

2. The implement of claim 1 wherein
   said basket means are in the form of a plurality of deformable strips arrayed radially about at least an axial section of said central shaft, each of said strips being connected to said shaft at the ends thereof and bending radially outward intermediate said connected ends.

3. The implement of claim 1 wherein
   said central shaft portion and said elongated shaft portion are in the form of elongated tubular members, being hollow to minimize weight and having slight lateral flexibility.

4. The implement of claim 1, and further including a quiver for enclosing all of the segments when not in use.

5. The implement of claim 4 wherein
   the quiver is in the form of an elongated tube closed at one end and having a detachable cap member at the other end.

6. The implement of claim 5 wherein
   the quiver further includes a carrying handle and hanger means for attaching the quiver to external support structures so as to support the quiver in reachable proximity the user.

7. The implement of claim 1 wherein
   said first connecting means is in the form of a female portion including an expanded diameter hollow section open toward the near end of the associated segment along the axis of the segment; and
   said second connecting means is in the form of a male portion, having the same shape as the open end of said female portion but having an exterior diameter slightly less than the interior diameter of said female portion, adapted to slidably mate with said female portion of an adjacent segment along the common longitudinal axis of such adjacent segments.

8. The implement of claim 7 wherein
   said female portion includes a pin receiving depression and said male portion includes a spring-urged pin adapted to mate with said pin receiving depression an one of said female portions when said adjacent portions are engaged to a preselected degree, said preselected degree being sufficient to achieve a connection whereby the adjacent segments are secured together to form a single semirigid linear shaft.

9. The implement of claim 7 wherein
   said female portion includes a detent to prevent said male portion from slidably engaging said female portion to too great of a degree.

10. The implement of claim 8 wherein
    said pin receiving depression is in the form of an aperture formed in the side wall of said female portion, and said spring urged pin has a diameter slightly less than said aperture and is urged to project outward through said aperture when the adjacent segments are properly engaged and aligned.

11. The implement of claim 8 wherein:

said spring urged pin is urged into position by a spring mechanism formed of flexible material and including a barrel portion secured in the interior of said male portion, a taper portion connected to said barrel portion for limiting rigidity, and a deformable tongue portion attached to said barrel portion at the narrowest part of said taper portion, said tongue portion having said pin mounted thereon at a position longitudinally displaced from said barrel.

12. A device for use in installation and placement of articles within volumes having limited access, such as overhead ceiling spaces, the device being modular in nature and comprising:

- a terminal positioning segment having a first attachment structure situated at one longitudinal end thereof, the terminal positioning segment including a blunt end opposite said first attachment structure and an expanded portion, said expanded portion extending longitudinally away from said blunt end and having an effective diameter such that, when an assembled one of the device is placed on a planar surface, only said expanded portion and said article grasping segment touch the planar surface;
- a plurality of intermediate segments for extending the total length of the device by serial attachment, each intermediate segment being an elongated member provided at one end with one of said first attachment structures and at the opposing end with a second attachment structure, said second attachment structure being formed so as to mate with said first attachment structure to form therewith a releasable bond having the effect of coupling adjacent segments into a linear combined member; and
- an article grasping segment including one of said second attachment structures and grasping means for releasably attaching articles to said device.

13. The device of claim 12 wherein the intermediate segments are in the form of elongated cylindrical tubular members, being generally rigid but having some lateral flexibility relative to their longitudinal axes.

14. The device of claim 13 wherein each of the intermediate segments is selected to have a length equal to the length of the ceiling tiles typically used in the geographical area of the intended usage of the device.

15. The device of claim 12 wherein said expanded portion is compressible so as to allow said terminal positioning segment to be forced through openings smaller than said effective diameter.

16. The device of claim 12 wherein said expanded section is generally radially symmetrical about the longitudinal axis of the device so as to allow the device to be rolled thereon.

17. The device of claim 12 wherein said grasping means includes a ring for receiving elongated cable.

18. The device of claim 12 and further including a quiver for receiving, storing and transporting an operant set of the segments.

* * * * *